United States Patent
Odashima et al.

(10) Patent No.: US 8,883,363 B2
(45) Date of Patent: Nov. 11, 2014

(54) FUEL GAS SUPPLY DEVICE OF FUEL CELL SYSTEM

(75) Inventors: Masato Odashima, Yokosuka (JP); Keisuke Satou, Ebina (JP); Takatada Usami, Yokohama (JP); Kentaro Kono, Yokohama (JP); Akinobu Moriyama, Yokohama (JP); Masahiro Haruyama, Yokosuka (JP); Akira Inoue, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 193 days.

(21) Appl. No.: 13/375,348

(22) PCT Filed: Jun. 22, 2010

(86) PCT No.: PCT/JP2010/060935
§ 371 (c)(1),
(2), (4) Date: Nov. 30, 2011

(87) PCT Pub. No.: WO2010/150904
PCT Pub. Date: Dec. 29, 2010

(65) Prior Publication Data
US 2012/0070758 A1    Mar. 22, 2012

(30) Foreign Application Priority Data
Jun. 22, 2009  (JP) ................................ 2009-147731

(51) Int. Cl.
*H01M 8/04* (2006.01)
*B60L 11/18* (2006.01)

(52) U.S. Cl.
CPC ....... *B60L 11/1887* (2013.01); *H01M 8/04201* (2013.01); *Y02E 60/50* (2013.01); *H01M 8/04089* (2013.01); *Y02T 90/34* (2013.01); *H01M 8/0438* (2013.01)
USPC .......................................... 429/444; 429/443

(58) Field of Classification Search
CPC . H01M 8/04; H01M 8/04089; H01M 8/0438; H01M 8/04201; B60L 11/1887; Y02T 90/34; Y02E 60/50
USPC .......................................................... 429/444
See application file for complete search history.

(56) References Cited

U.S. PATENT DOCUMENTS 7,981,559 B2    7/2011   Yoshida
8,071,249 B2   12/2011   Hasuka et al.
(Continued)

FOREIGN PATENT DOCUMENTS

CN    101233641 A    7/2008
CN    101326667 A   12/2008
(Continued)

OTHER PUBLICATIONS

Akira Yamashita et al., Development of High-Pressure Hydrogen Valve System for FCHV, Auto Technical Meeting Seminar, May 19, 2010, pp. 13-16.
Chinese Office Action, Sep. 13, 2013, 8 pages.

*Primary Examiner* — Gary Harris
(74) *Attorney, Agent, or Firm* — Foley & Lardner LLP

(57) ABSTRACT

A fuel gas supply device for supplying fuel gas to a fuel cell stack includes a control valve provided in a fuel gas path connecting a fuel tank and the fuel cell stack, an upstream-side pressure sensor and a downstream-side pressure sensor for detecting an upstream-side pressure and a downstream-side pressure, and a programmable controller. The programmable controller calculates a required opening based on a target fuel gas pressure and the downstream-side pressure and calculates an opening time and a closing time based on the required opening and the upstream-side pressure, or calculates an opening time and a closing time based on the target fuel gas pressure and the downstream-side pressure and calculates a required opening based on the opening time and the upstream-side pressure, and controls the control valve using the calculated required opening, opening time and closing time.

12 Claims, 17 Drawing Sheets

(56) References Cited

U.S. PATENT DOCUMENTS

| | | |
|---|---|---|
| 8,563,191 B2 | 10/2013 | Katano et al. |
| 2008/0220303 A1* | 9/2008 | Yoshida .......................... 429/25 |
| 2009/0233132 A1 | 9/2009 | Hasuka et al. |
| 2010/0151343 A1* | 6/2010 | Katano et al. ................. 429/444 |
| 2010/0285382 A1 | 11/2010 | Hasuka et al. |

FOREIGN PATENT DOCUMENTS

| | | |
|---|---|---|
| JP | 2006-331863 A | 12/2006 |
| JP | 2007-188857 A | 7/2007 |
| WO | WO 2005/088755 A1 | 9/2005 |
| WO | WO 2007/069472 A1 | 6/2007 |

\* cited by examiner

FUEL GAS SUPPLY DEVICE OF FUEL CELL SYSTEM

TECHNICAL FIELD

This invention relates to a part of a system for supplying fuel gas to a fuel cell stack.

BACKGROUND ART

JP2007-188857A issued in 2007 by the Japan Patent Office discloses a fuel gas supply device for supplying hydrogen stored in a high-pressure hydrogen tank to a fuel cell stack via an electromagnetic injector.

SUMMARY OF INVENTION

The fuel gas supply device includes an injector which changes an opening time while maintaining a predetermined opening, thereby regulating the flow rate of hydrogen supplied to the fuel cell stack to control a hydrogen pressure in the fuel cell stack. However, such an injector has a problem that the amount of hydrogen during the same opening time changes if the hydrogen pressure at an upstream side of the injector changes.

It is also thought to use an electromagnetic pressure regulating valve instead of the injector in the fuel gas supply device. The pressure regulating valve controls the hydrogen pressure in the fuel cell stack by changing an opening area to regulate the flow rate of hydrogen supplied to the fuel cell stack. However, such a pressure regulating valve has a problem that the flow rate of hydrogen in the same opening area changes if the hydrogen pressure at an upstream side of the pressure regulating valve changes.

From the above reasons, a pressure reducing valve which reduces an upstream-side hydrogen pressure and makes it constant to stably supply hydrogen is necessary in the case of regulating a hydrogen flow rate by an injector or a pressure regulating valve in a fuel cell system in which the upstream-side hydrogen pressure changes due to hydrogen consumption at the time of power generation. As a result, it is unavoidable that the construction of the fuel gas supply device becomes complicated.

Accordingly, an object of this invention is to provide a fuel gas supply device capable of stably supplying fuel gas without using a pressure reducing valve.

This invention is directed to a fuel gas supply device for supplying fuel gas to a fuel cell stack which generates power using the fuel gas and oxidant gas. The fuel gas supply device comprises a fuel tank storing the fuel gas, a fuel gas path connecting the fuel tank and the fuel cell stack, a control valve provided in the fuel gas path for controlling a supply amount of the fuel gas, an upstream-side pressure sensor for detecting an upstream-side pressure of the fuel gas at an upstream side of the control valve, a downstream-side pressure sensor for detecting a downstream-side pressure of the fuel gas at a downstream side of the control valve, and a programmable controller. The programmable controller calculates a required opening of the control valve based on a target fuel gas pressure in the fuel cell stack and the detected downstream-side pressure and calculates an opening time and a closing time of the control valve based on the required opening and the detected upstream-side pressure, or calculates an opening time and a closing time of the control valve based on the target fuel gas pressure in the fuel cell stack and the detected downstream-side pressure and calculates a required opening of the control valve based on the opening time and the detected upstream-side pressure, and controls the control valve using the calculated required opening, opening time and closing time.

The details as well as other features and advantages of this invention are set forth in the remainder of the specification and are shown in the accompanying drawings.

DESCRIPTION OF EMBODIMENTS

With reference to FIGS. 1 to 8, a first embodiment of this invention is described.

Figure 1:
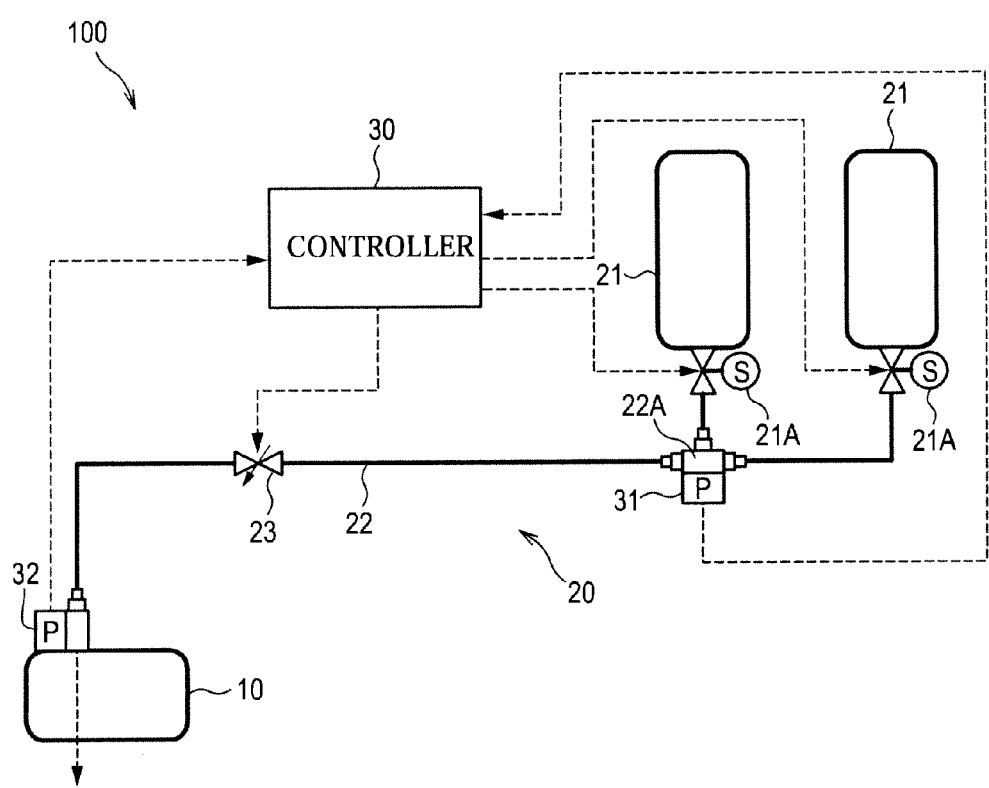
FIG. 1 is a schematic diagram of a fuel cell system according to a first embodiment of this invention.

FIG. 1 is a schematic diagram of a fuel cell system 100 to be mounted in an electric vehicle.

The fuel cell system 100 includes a fuel cell stack 10 and a hydrogen supply mechanism 20.

The fuel cell stack 10 is formed by laminating solid polymer unit cells, which generate power using hydrogen as fuel gas supplied by the hydrogen supply mechanism 20 and air as oxidant gas supplied by an unillustrated air supply mechanism, in a plurality of layers. The fuel cell stack 10 generates power necessary to drive the electric vehicle.

The hydrogen supply mechanism 20 is a means for supplying hydrogen to the fuel cell stack 10 and includes high-pressure hydrogen tanks 21, a hydrogen supply path 22, a hydrogen supply control valve 23 and a controller 30.

Two high-pressure hydrogen tanks 21 are provided at an upstream side of the hydrogen supply path 22. The high-pressure hydrogen tanks 21 store hydrogen to be supplied to the fuel cell stack 10 in a high-pressure state of e.g. 70 MPa. Each high-pressure hydrogen tank 21 includes an on-off valve 21A for controlling a communicating state of the high-pressure hydrogen tank 21 and the hydrogen supply path 22. The on-off valve 21A is an electromagnetic valve and cuts off communication between the high-pressure hydrogen tank 21 and the hydrogen supply path 22 when a power supply is off.

The hydrogen supply path 22 is a path in which hydrogen to be supplied to the fuel cell stack 10 flows. The upstream side of the hydrogen supply path 22 is branched into two paths and connected to the respective high-pressure hydrogen tanks 21 via the on-off valves 21A. A downstream side of the hydrogen supply path 22 is connected to a hydrogen supply manifold of the fuel cell stack 10. A hydrogen supply control valve 23 for controlling a hydrogen flow rate is provided in the hydrogen supply path 22 between a joint unit 22A of the hydrogen supply path 22 and the fuel cell stack 10. Note that the hydrogen supply path 22 is formed by a high-pressure pipe at an upstream side of the hydrogen supply control valve 23 and is formed by a low-pressure pipe at a downstream side of the hydrogen supply control valve 23.

The hydrogen supply control valve 23 controls a hydrogen pressure at fuel electrodes of the unit cells by regulating the flow rate of hydrogen supplied from the high-pressure hydrogen tanks 21 to the fuel cell stack 10.

The controller 30 is a device for centrally controlling the fuel cell system 100 and composed of a microcomputer including a central processing unit (CPU), a read-only memory (ROM), a random access memory (RAM) and an input/output interface (I/O interface). Signals from an upstream side pressure sensor 31 and a downstream-side pressure sensor 32 are input to the controller 30.

The upstream-side pressure sensor 31 is disposed in the joint unit 22A of the hydrogen supply path 22. The upstream-side pressure sensor 31 detects a hydrogen pressure in the hydrogen supply path 22 of the upstream side from the hydrogen supply control valve 23, i.e. an upstream side hydrogen pressure. Since no pressure reducing valve is provided at the upstream side of the hydrogen supply control valve 23 in the hydrogen supply mechanism 20, pressures in the high-pressure hydrogen tanks 21 can also be simultaneously detected by the upstream-side pressure sensor 31.

The downstream-side pressure sensor 32 is disposed in the vicinity of a downstream end of the hydrogen supply path 22. The downstream-side pressure sensor 32 detects a hydrogen pressure in the hydrogen supply path 22 of the downstream side from the hydrogen supply control valve 23, i.e. a downstream-side hydrogen pressure. The downstream-side hydrogen pressure represents the hydrogen pressure at the fuel electrodes of the unit cells.

The controller 30 controls the on-off valves 21A and the hydrogen supply control valve 23 based on signals form the upstream-side pressure sensor 31, the downstream-side pressure sensor 32 and the like.

A hydrogen supply mechanism of a conventional fuel cell system is so constructed that highly pressurized hydrogen stored in a high-pressure hydrogen tank is reduced to a predetermined pressure by a pressure reducing valve and the pressure-reduced hydrogen is controlled to a target hydrogen pressure range by an injector or a pressure regulating valve. Since the pressure reducing valve is provided in this way, there has been a problem that the construction of the hydrogen supply mechanism becomes complicated.

On the other hand, the hydrogen supply mechanism 20 of the fuel cell system 100 has a simple construction using no pressure reducing valve and regulates the flow rate of hydrogen to be supplied to the fuel cell stack 10 and controls the hydrogen pressure to the target hydrogen pressure range by simultaneously controlling the opening, opening time and closing time of the hydrogen supply control valve 23.

Figure 2:
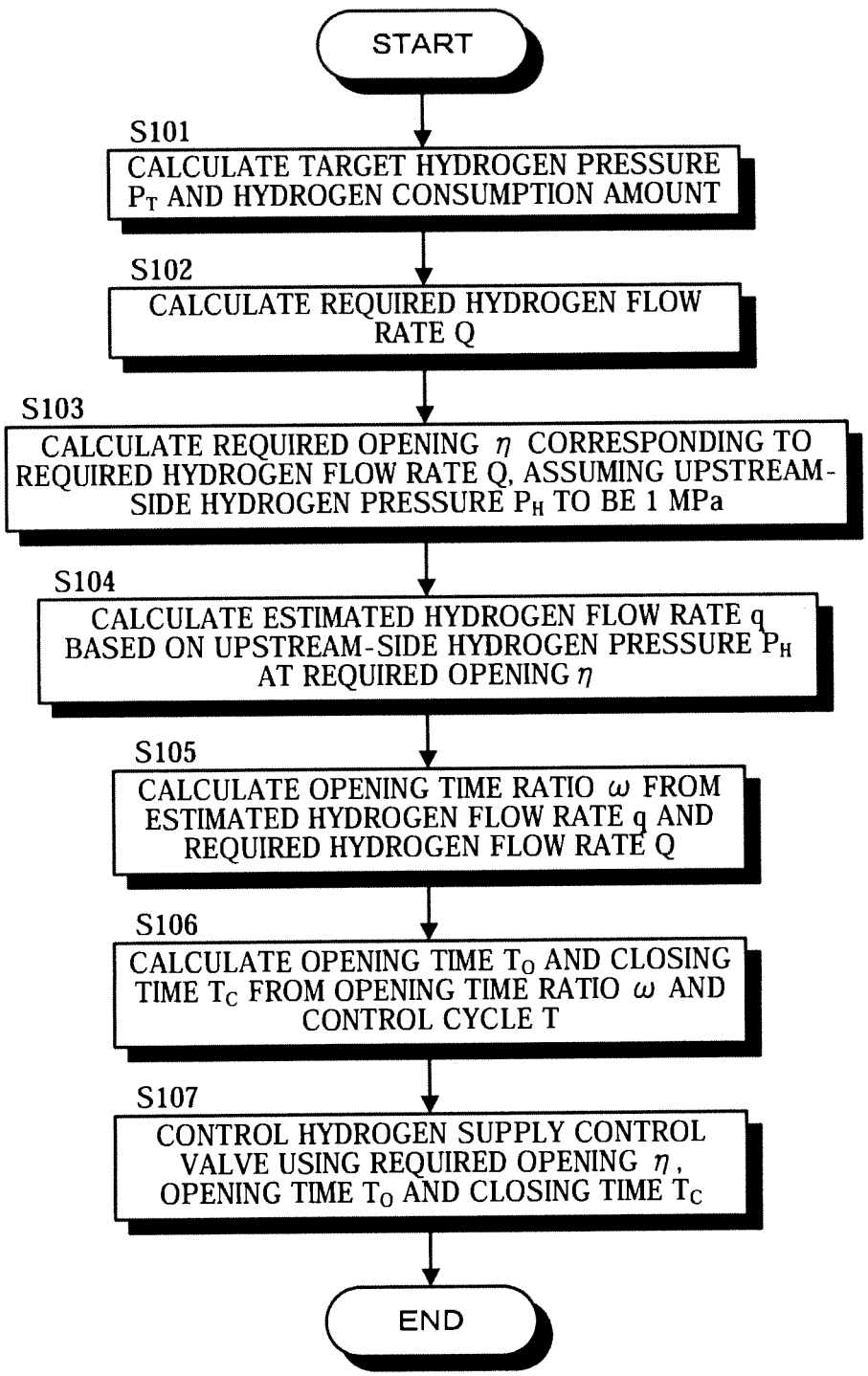
FIG. 2 is a flow chart showing a control routine for a hydrogen supply control valve executed by a controller according to the first embodiment of this invention.

Referring to FIG. 2, A control routine for the hydrogen supply control valve 23 executed by the controller 30 is described. This routine is continuously executed in a predetermined control cycle T during power generation of the fuel cell stack 10. The control cycle T is set at as short a period as possible, e.g. 10 msec, in consideration of responsiveness of the hydrogen supply control valve 23.

In Step S101, the controller 30 calculates a target hydrogen pressure $P_T$ in the fuel cell stack 10 and a hydrogen consumption amount consumed by the fuel cell stack 10 based on a target output value of the fuel cell stack 10 obtained from a depression amount of an accelerator pedal provided in the vehicle.

Figure 3:
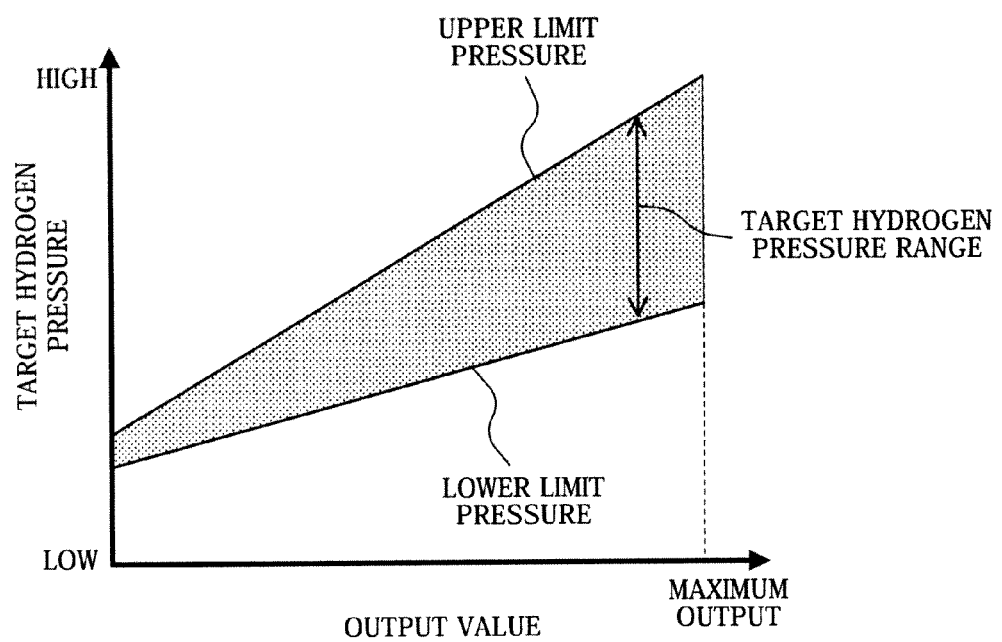
FIG. 3 is a diagram showing a characteristic of a target hydrogen pressure map stored in the controller.

The controller 30 sets the target hydrogen pressure $P_T$ in a target hydrogen pressure range determined by an upper limit pressure and a lower limit pressure by referring to a target hydrogen pressure map which is stored in the ROM beforehand and has a characteristic shown in FIG. 3. In this embodiment, the target hydrogen pressure $P_T$ is determined based on an output value and the lower limit pressure in consideration of influences such as pressure overshoot.

Referring back to FIG. 2, in Step S102, the controller 30 calculates a total hydrogen amount needed to be supplied to the fuel cell stack 10 during the control cycle T based on a deviation between the target hydrogen pressure $P_T$ and a downstream-side hydrogen pressure $P_L$ detected by the downstream-side pressure sensor 32 and the hydrogen consumption amount and calculates a required hydrogen flow rate Q as an average hydrogen flow rate from the total hydrogen amount and the control cycle T.

Although the required hydrogen flow rate Q is calculated based on the deviation between the target hydrogen pressure $P_T$ and the downstream-side hydrogen pressure $P_L$ and the hydrogen consumption amount in Step S102, it may be calculated based only on the deviation between the target hydrogen pressure $P_T$ and the downstream-side hydrogen pressure $P_L$. Further, the calculated required hydrogen flow rate Q may be corrected based on the temperature of hydrogen being supplied. That is, the required hydrogen flow rate Q can be calculated based on various physical quantities including the target hydrogen pressure $P_T$ and the downstream-side hydrogen pressure $P_L$.

In Step S103, the controller 30 calculates a required opening η of the hydrogen supply control valve 23 corresponding to the required hydrogen flow rate Q when an upstream-side hydrogen pressure $P_H$ is assumed to be 1 MPa. That is, the required opening η of the hydrogen supply control valve 23 is so set that the flow rate of hydrogen passing through the hydrogen supply control valve 23 becomes the required hydrogen flow rate Q when the upstream-side hydrogen pressure $P_H$ is assumed to be 1 MPa. Although the upstream-side hydrogen pressure $P_H$ is assumed to be 1 MPa in Step S103, it may be an arbitrary pressure such as 0.1 MPa, 0.8 MPa or 1.5 MPa without being limited to 1 MPa.

Figure 4:
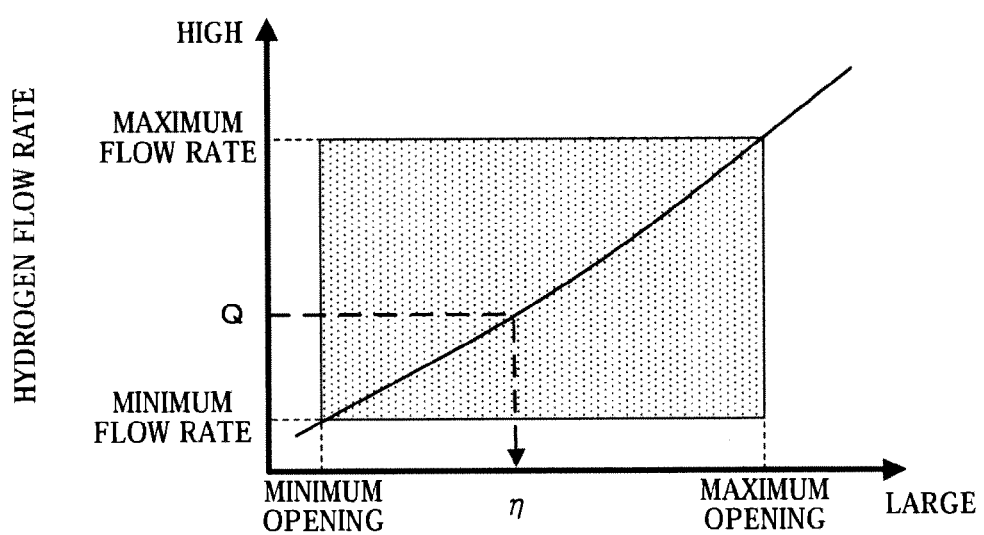
FIG. 4 is a diagram showing a characteristic of an opening map for the hydrogen supply control valve stored in the controller.

The controller 30 sets the required opening η of the hydrogen supply control valve 23 in a range defined between a minimum opening and a maximum opening by referring to an opening map which is stored in the ROM beforehand and has a characteristic shown in FIG. 4. In this map, the upstream-side hydrogen pressure is set at 1 MPa. Note that the hydrogen supply control valve 23 can be controlled from a closed state to a fully open state having an opening larger than the maximum opening.

Referring back to FIG. 2, in Step S104, the controller 30 calculates an estimated hydrogen flow rate q at the time of opening of the hydrogen supply control valve 23 based on the upstream-side hydrogen pressure $P_H$ detected by the upstream-side pressure sensor 31 at the required opening η.

Figure 5:
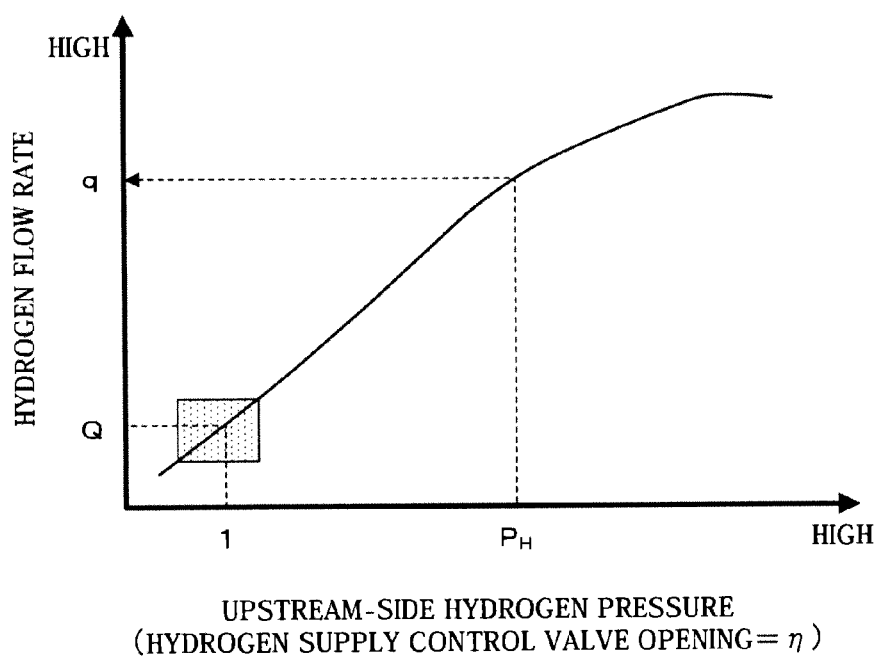
FIG. 5 is a diagram showing a characteristic of a hydrogen flow rate map stored in the controller.

The controller 30 calculates the estimated hydrogen flow rate q by referring to a hydrogen flow rate map which is stored in the ROM beforehand and has a characteristic shown in FIG. 5. The hydrogen flow rate map is prepared for each required opening η of the hydrogen supply control valve 23.

Referring back to FIG. 2, in Step S105, the controller 30 calculates an opening time ratio ω from the estimated hydrogen flow rate q and the required hydrogen flow rate Q. The controller 30 sets a ratio of the required hydrogen flow rate Q to the estimated hydrogen flow rate q as the opening time ratio ω.

In Step S106, the controller 30 calculates an opening time $T_O$ of the hydrogen supply control valve 23 by multiplying the control cycle T by the opening time ratio ω and calculates a closing time $T_C$ of the hydrogen supply control valve 23 by multiplying the control cycle T by 1-ω.

In Step S107, the controller 30 controls the hydrogen supply control valve 23 such that the hydrogen supply control valve 23 is opened at the required opening η during the opening time $T_O$ out of the control cycle T and closed during the closing time $T_C$.

Figure 6:
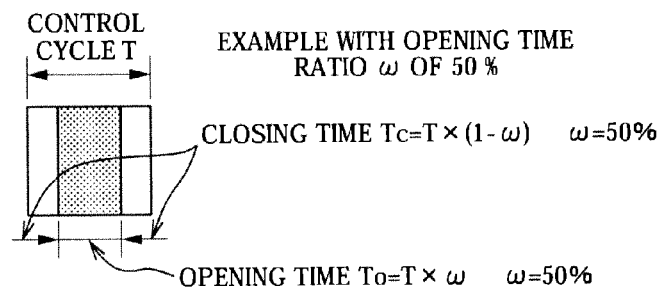
FIG. 6 is a diagram showing an opening time ratio ω of the hydrogen supply control valve.
Figure 7:
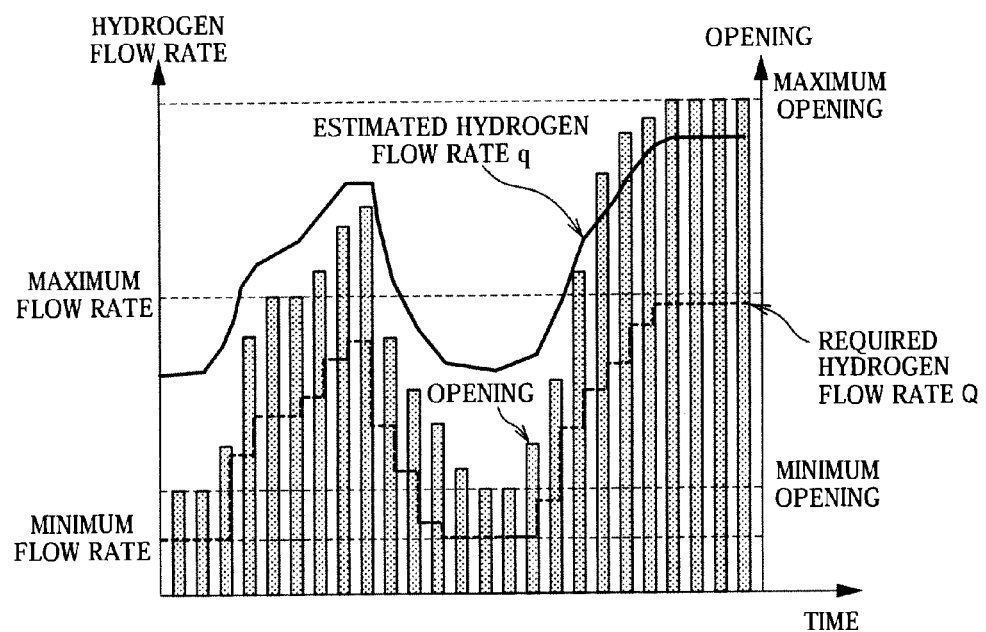
FIG. 7 is a timing chart showing changes in opening of the hydrogen supply control valve and hydrogen flow rate during the execution of the control routine.
Figure 8:
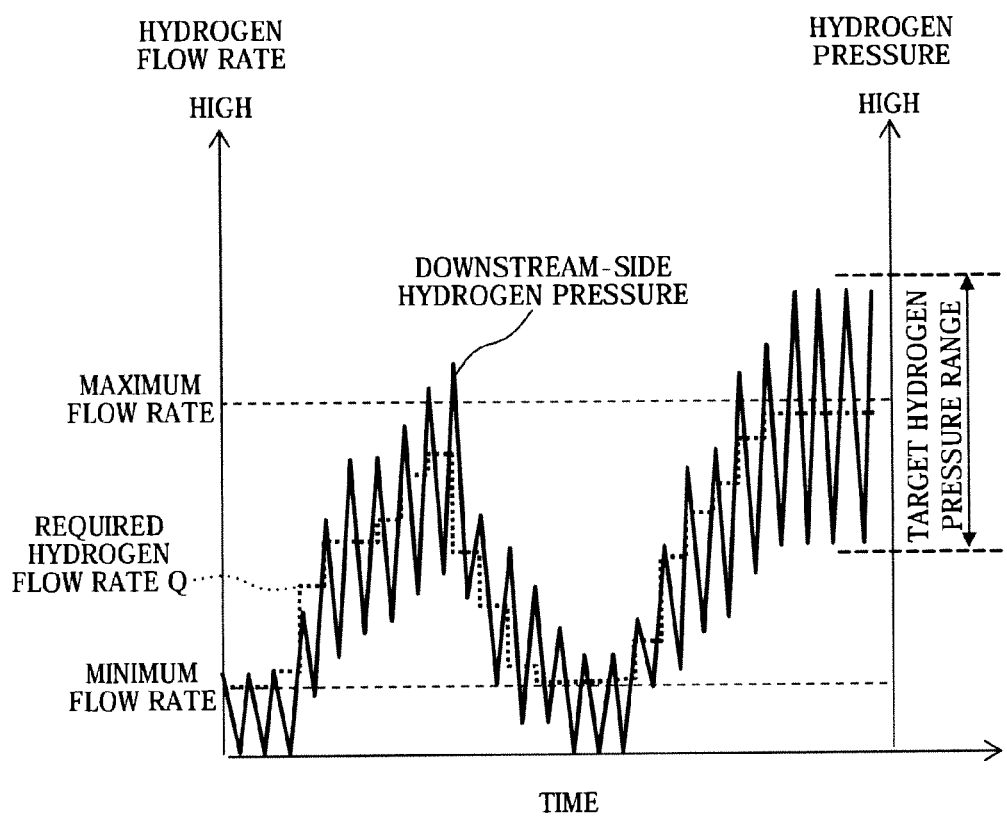
FIG. 8 is a timing chart showing changes in hydrogen flow rate and downstream-side hydrogen pressure.

Referring to FIG. 6, since the controller 30 opens the hydrogen supply control valve 23 at the required opening η only during the opening time $T_O$ out of the control cycle T and closes it during the other time, hydrogen is intermittently supplied to the fuel cell stack 10. By intermittently supplying hydrogen in this way, the average hydrogen flow rate during the control cycle T can be regulated to the required hydrogen flow rate Q as shown by a broken line in FIG. 7. Further, as shown in FIG. 8, the downstream-side hydrogen pressure $P_L$ can be controlled to the target hydrogen pressure range. Note that the target hydrogen pressure range of the downstream-side hydrogen pressure $P_L$ changes according to an output value of the fuel cell stack 10 as shown in FIG. 3.

Because of the above, the hydrogen supply mechanism 20 of the fuel cell system 100 can obtain the following effects.

In the hydrogen supply mechanism 20, hydrogen is intermittently supplied to the fuel cell stack 10 by setting the required opening of the hydrogen supply control valve 23 based on the target hydrogen pressure in the fuel cell stack 10 and the downstream-side hydrogen pressure and setting the opening time and the closing time of the hydrogen supply control valve 23 based on the required opening and the upstream-side hydrogen pressure. In this way, even if the upstream-side hydrogen pressure changes due to hydrogen consumption by power generation or the like, the average hydrogen flow rate during the control cycle can be regulated to the required hydrogen flow rate and the downstream-side hydrogen pressure can be controlled in the target hydrogen pressure range. Accordingly, the hydrogen supply mechanism 20 need not include a pressure reducing valve in the hydrogen supply path 22 at the upstream side of the hydrogen supply control valve 23 and can stably supply hydrogen by a simple construction.

Since hydrogen from the high-pressure hydrogen tanks 21 is controlled in the target hydrogen pressure range in one stage by the hydrogen supply control valve 23 in the hydrogen supply mechanism 20, a pressure loss in the hydrogen supply path 22 can be reduced as compared to the conventional technique including a pressure reducing valve. Thus, it is possible to reduce an invalid remaining amount of hydrogen in the high-pressure hydrogen tanks 21 and extend a cruising distance of the vehicle.

Since the higher the upstream-side hydrogen pressure, the higher the estimated hydrogen flow rate, the opening time ratio ω is set to be small. Thus, when the upstream-side hydrogen pressure is high, the closing time of the hydrogen supply control valve 23 can be extended so as to suppress power consumption at the hydrogen supply control valve 23 and the opening time of the hydrogen supply control valve 23 can be reduced so as to suppress application of an excessive pressure to the fuel electrodes of the fuel cell stack 10.

Next, a second embodiment of this invention is described with reference to FIGS. 9 to 11.

Although a fuel cell system 100 according to the second embodiment has substantially the same construction as the first embodiment, it differs in how to determine a required opening η, an opening time $T_O$ and a closing time $T_C$ of a hydrogen supply control valve 23.

Figure 9:
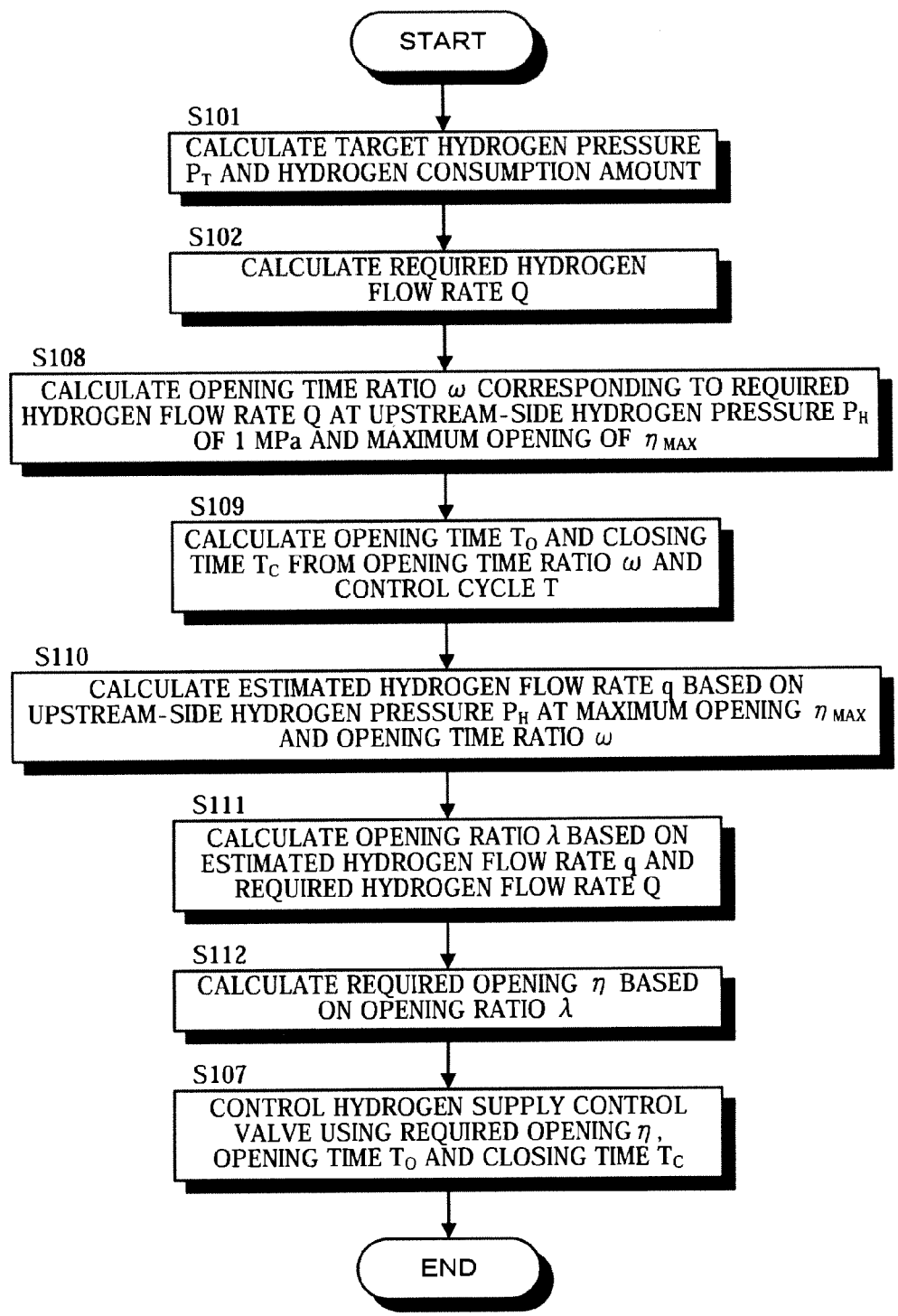
FIG. 9 is a flow chart showing a control routine for a hydrogen supply control valve executed by a controller according to a second embodiment of this invention.

Referring to FIG. 9, a control routine for the hydrogen supply control valve 23 executed by a controller 30 of the fuel cell system 100 according to the second embodiment is described. Contents of Steps S101, S102 and S107 of FIG. 9 are not described in detail since being similar to Steps S101, S102 and S107 of FIG. 2.

After calculating a required hydrogen flow rate Q in Step S102, the controller 30 performs the processing of Step S108.

In Step S108, the controller 30 calculates an opening time ratio ω so that an average flow rate of hydrogen during a control cycle T becomes a required hydrogen flow rate Q, assuming that an upstream-side hydrogen pressure $P_H$ is reduced to 1 MPa and the opening of the hydrogen supply control valve 23 is a maximum opening $\eta_{MAX}$.

Figure 10:
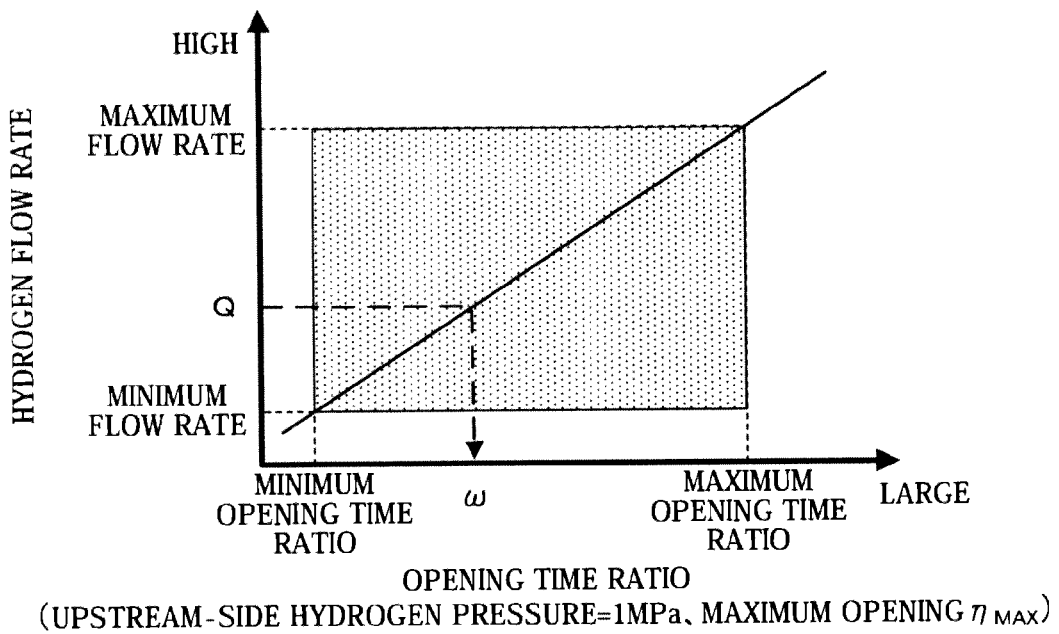
FIG. 10 is a diagram showing a characteristic of an opening time ratio map for the hydrogen supply control valve stored in the controller according to the second embodiment of this invention.

As shown in FIG. 10, the controller 30 calculates the opening time ratio ω by referring to an opening time ratio map stored in a ROM beforehand when the upstream-side hydrogen pressure $P_H$ is 1 MPa and the opening of the hydrogen supply control valve 23 is the maximum opening $\eta_{MAX}$.

Referring back to FIG. 9, in Step S109, the controller 30 calculates the opening time $T_O$ of the hydrogen supply control valve 23 by multiplying the control cycle T by the opening time ratio ω and calculates the closing time $T_C$ of the hydrogen supply control valve 23 by multiplying the control cycle T by 1-ω.

In Step S110, the controller 30 calculates an estimated hydrogen flow rate q corresponding to the upstream-side hydrogen pressure $P_H$ at the maximum opening $\eta_{MAX}$ and the opening time ratio $\omega$.

Figure 11:
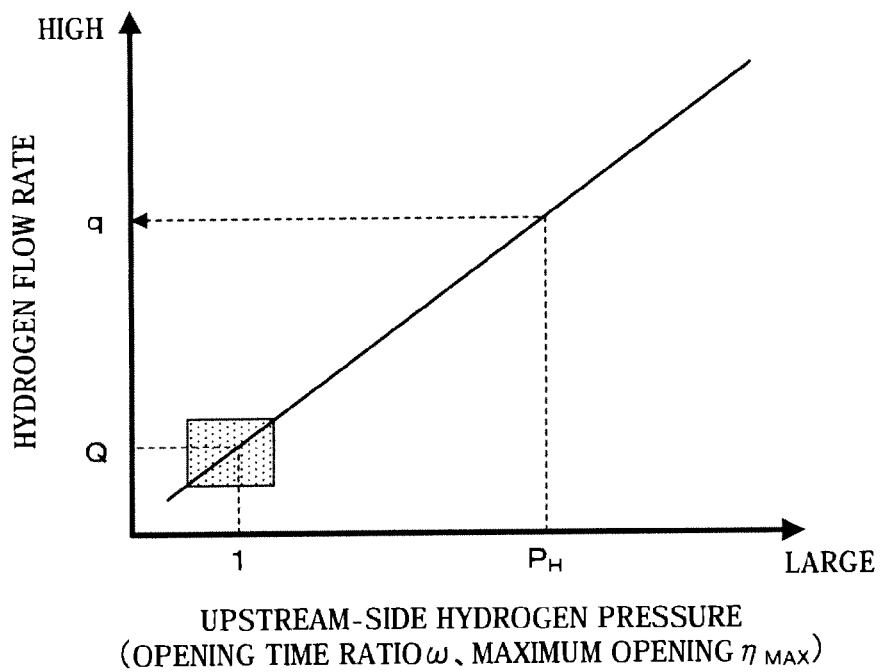
FIG. 11 is a diagram showing a characteristic of a hydrogen flow rate map stored in the controller according to the second embodiment of this invention.

As shown in FIG. 11, the controller 30 calculates the estimated hydrogen flow rate q by referring to a hydrogen flow rate map stored in the ROM beforehand when the opening of the hydrogen supply control valve 23 is the maximum opening $\eta_{MAX}$ and the opening time ratio $\omega$ is set. The hydrogen flow rate map is prepared for each opening time ratio $\omega$ of the hydrogen supply control valve 23.

Referring back to FIG. 9, in Step S111, the controller 30 calculates an opening ratio $\lambda$ from the estimated hydrogen flow rate q and the required hydrogen flow rate Q. The controller 30 sets a ratio of the required hydrogen flow rate Q to the estimated hydrogen flow rate q as the opening ratio $\lambda$.

In Step S112, the controller 30 calculates the required opening $\eta$ of the hydrogen supply control valve 23 by multiplying the maximum opening $\eta_{MAX}$ by the opening ratio $\lambda$.

Then, in Step S107, the controller 30 controls the hydrogen supply control valve 23 such that the hydrogen supply control valve 23 is opened at the required opening $\eta$ during the opening time $T_O$ out of the control cycle T and closed during the closing time $T_C$.

Because of the above, the hydrogen supply mechanism 20 of the fuel cell system 100 can obtain the following effects.

In the hydrogen supply mechanism 20, hydrogen is intermittently supplied to the fuel cell stack 10 by setting the opening time and the closing time of the hydrogen supply control valve 23 based on the target hydrogen pressure in the fuel cell stack 10 and the downstream-side hydrogen pressure and setting the required opening of the hydrogen supply control valve 23 based on the opening time of the hydrogen supply control valve 23 and the upstream-side hydrogen pressure. Accordingly, similar to the first embodiment, the hydrogen supply mechanism 20 need not include a pressure reducing valve in the hydrogen supply path 22 at the upstream side of the hydrogen supply control valve 23 and can stably supply hydrogen by a simple construction.

Since hydrogen from high-pressure hydrogen tanks 21 is controlled in the target hydrogen pressure range in one stage by the hydrogen supply control valve 23 in the hydrogen supply mechanism 20, a pressure loss in the hydrogen supply path 22 can be reduced as compared to the conventional technique including a pressure reducing valve. Thus, it is possible to reduce an invalid remaining amount of hydrogen in the high-pressure hydrogen tanks 21 and extend a cruising distance of the vehicle.

Since the higher the upstream-side hydrogen pressure, the higher the estimated hydrogen flow rate, the opening ratio is set to be small. Thus, when the upstream-side hydrogen pressure is high, the required opening of the hydrogen supply control valve 23 becomes smaller and application of an excessive pressure to fuel electrodes of the fuel cell stack 10 can be suppressed.

Next, a third embodiment of this invention is described with reference to FIGS. 12 and 13.

Although a fuel cell system 100 according to the third embodiment has substantially the same construction as the first and second embodiments, it differs in that a required opening $\eta$, an opening time $T_O$ and a closing time $T_C$ of a hydrogen supply control valve 23 are corrected according to a vehicle operating state or the like.

Figure 12:
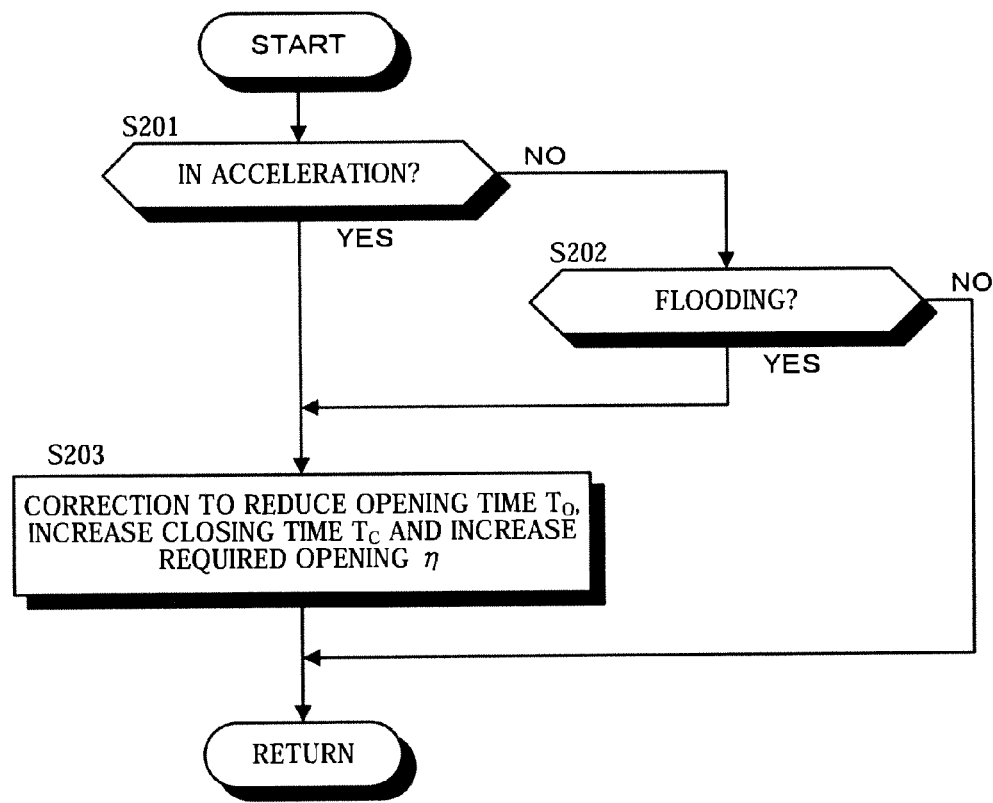
FIG. 12 is a flow chart showing a subroutine of a control for a hydrogen supply control valve executed by a controller according to a third embodiment of this invention.

Referring to FIG. 12, a control subroutine for the hydrogen supply control valve 23 executed by a controller 30 according to the third embodiment is described. This subroutine is performed in Step S107 of the first or second embodiment.

In Step S201, the controller 30 determines whether or not the vehicle is in acceleration based on a deviation between the target hydrogen pressure $P_T$ and the downstream-side hydrogen pressure $P_L$.

If the deviation between the target hydrogen pressure $P_T$ and the downstream-side hydrogen pressure $P_L$ is large, the controller 30 determines that the vehicle is in acceleration and performs the processing of Step S203. On the other hand, if the deviation between the target hydrogen pressure $P_T$ and the downstream-side hydrogen pressure $P_L$ is small, the controller 30 determines that the vehicle is not in a transient state and performs the processing of Step S202.

In Step S202, the controller 30 determines the occurrence of flooding in the fuel cell stack 10. Flooding is a phenomenon in which produced water stays in a fuel gas flow path of the fuel cell stack 10 to prevent hydrogen diffusion.

The controller 30 determines the occurrence of flooding based on the water content of hydrogen in the fuel cell stack 10. If the water content is above a predetermined value, the controller 30 determines that flooding has occurred and performs the processing of Step S203. On the other hand, if the water content is below a predetermined value, the controller 30 determines that no flooding has occurred and ends the process.

Note that instead of judging the occurrence of flooding based on the water content of hydrogen, each unit cell voltage of the fuel cell stack 10 may be, for example, detected and it may be judged that flooding has occurred when there is any unit cell voltage which is equal to or below 80% of an average unit cell voltage in an operating state at that time.

In Step S203, the controller 30 reduces the opening time $T_O$ of the hydrogen supply control valve 23 and increases the closing time $T_C$ and further increases the required opening $\eta$ of the hydrogen supply control valve 23 so that the required hydrogen flow rate Q during the control cycle T does not change. By correcting opening and closing characteristics of the hydrogen supply control valve 23 in this way, the hydrogen flow rate at the time of opening the hydrogen supply control valve 23 can be higher than in normal time.

Figure 13:
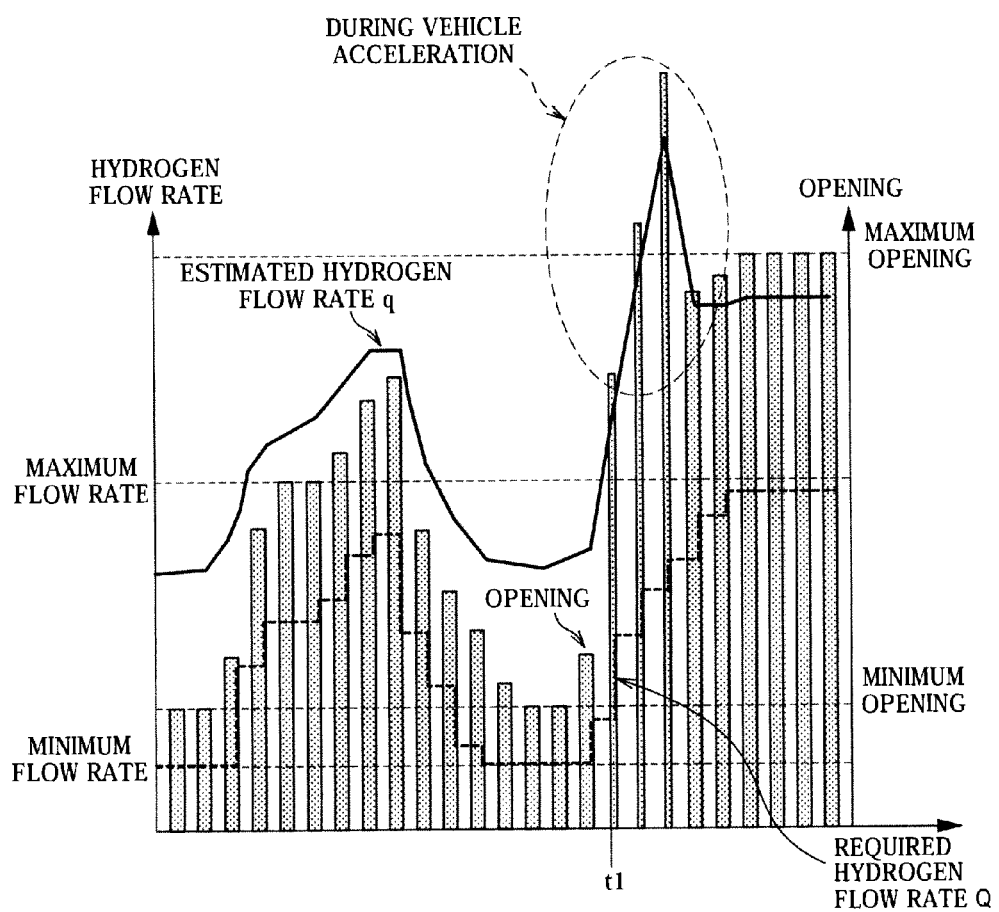
FIG. 13 is a timing chart showing changes in opening of the hydrogen supply control valve and hydrogen flow rate during the execution of the subroutine.

With reference to FIG. 13, functions of the correction control for the hydrogen supply control valve 23 during the acceleration of the vehicle are described.

If the vehicle is in acceleration at time t1, the controller 30 makes a correction to reduce the opening time $T_O$ of the hydrogen supply control valve 23, increase the closing time $T_C$ and increase the required opening $\eta$. By correcting the opening and closing characteristics of the hydrogen supply control valve 23 in this way, the hydrogen flow rate at the time of opening the hydrogen supply control valve 23 can be temporarily increased while the required hydrogen flow rate Q is maintained. Thus, even if a fuel cell stack output power changes in a short time such as during the acceleration of the vehicle, the downstream-side hydrogen pressure $P_L$ can be allowed to quickly follow the target hydrogen pressure range.

Because of the above, the hydrogen supply mechanism 20 of the fuel cell system 100 can obtain the following effects.

Since the correction is made to reduce the opening time of the hydrogen supply control valve 23, increase the closing time and increase the required opening during the acceleration of the vehicle, the hydrogen flow rate at the time of opening the hydrogen supply control valve 23 can be increased and a time required for the downstream-side hydrogen pressure to reach the target hydrogen pressure range can be shortened.

Further, since the hydrogen flow rate at the time of opening the hydrogen supply control valve 23 is increased by executing the correction control similar to the above also when flooding occurs, produced water staying in the fuel gas flow path of the fuel cell stack 10 can be effectively discharged. Particularly in congestion during which the output of the fuel cell stack 10 is kept at a low output over an extended period of time, produced water can be discharged as necessary.

Next, a fourth embodiment of this invention is described with reference to FIGS. 14 to 18.

A fuel cell system 100 according to the fourth embodiment differs in system configuration and control for a hydrogen supply control valve 23 as compared to the fuel cell systems according to the first to third embodiments.

Figure 14:
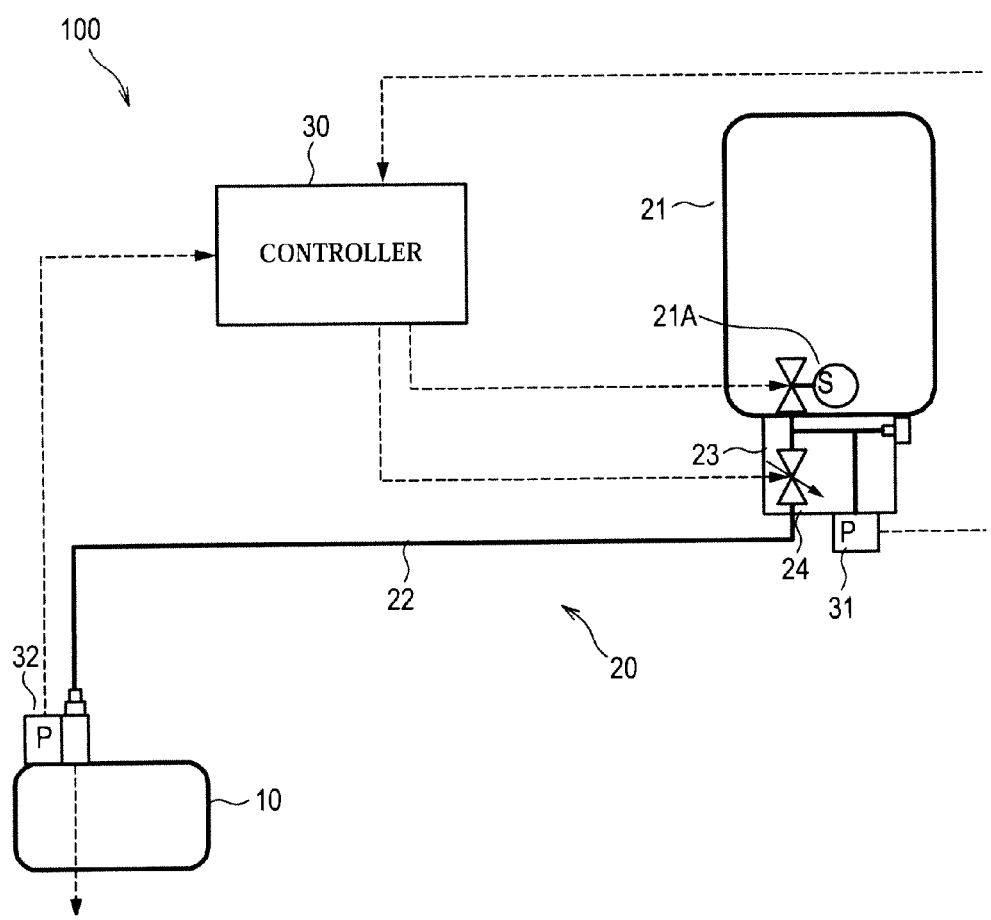
FIG. 14 is a schematic diagram of a fuel cell system according to a fourth embodiment of this invention.

As shown in FIG. 14, a hydrogen supply mechanism 20 of the fuel cell system 100 according to this embodiment supplies hydrogen from one high-pressure hydrogen tank 21 to a fuel cell stack 10. The high-pressure hydrogen tank 21 is connected to the fuel cell stack 10 via a hydrogen supply path 22.

An on-off valve 21A for controlling a communicating state of the high-pressure hydrogen tank 21 and the hydrogen supply path 22 is provided in the high-pressure hydrogen tank 21. Since the on-off valve 21A is provided in the high-pressure hydrogen tank 21, a failure of the on-off valve 21A can be suppressed in an abnormal situation such as collision of a vehicle and communication between the high-pressure hydrogen tank 21 and the hydrogen supply path 22 can be reliably cut off when abnormality occurs.

A frame body 24 is disposed at an end of the high-pressure hydrogen tank 21, and a hydrogen supply control valve 23 is arranged in the hydrogen supply path 22 in the frame body 24. Since the hydrogen supply control valve 23 is provided in the vicinity of the high-pressure hydrogen tank 21 and a high pressure pipe unit at an upstream side of the hydrogen supply control valve 23 is arranged in the frame body 24, breakage and the like of the high-pressure pipe unit can be reliably prevented also in an abnormal situation such as collision of the vehicle. Note that the hydrogen supply control valve 23 may be disposed in the high-pressure hydrogen tank 21.

Further, the upstream-side pressure sensor 31 for detecting a hydrogen pressure in the hydrogen supply path 22 at the upstream side of the hydrogen supply control valve 23 is disposed in the frame body 24.

Figure 15:
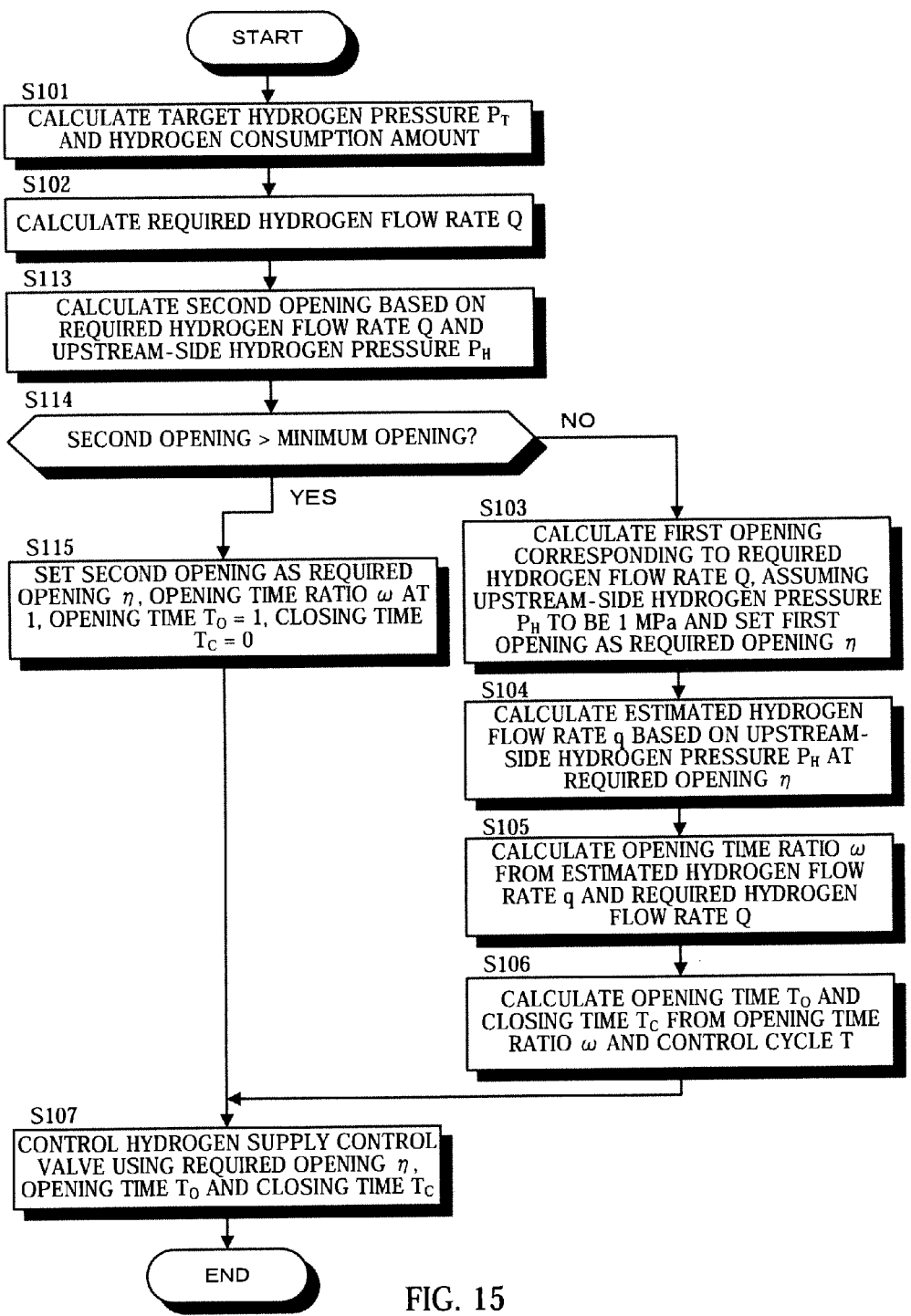
FIG. 15 is a flow chart showing a control routine for a hydrogen supply control valve executed by a controller according to the fourth embodiment of this invention.
Figure 16:
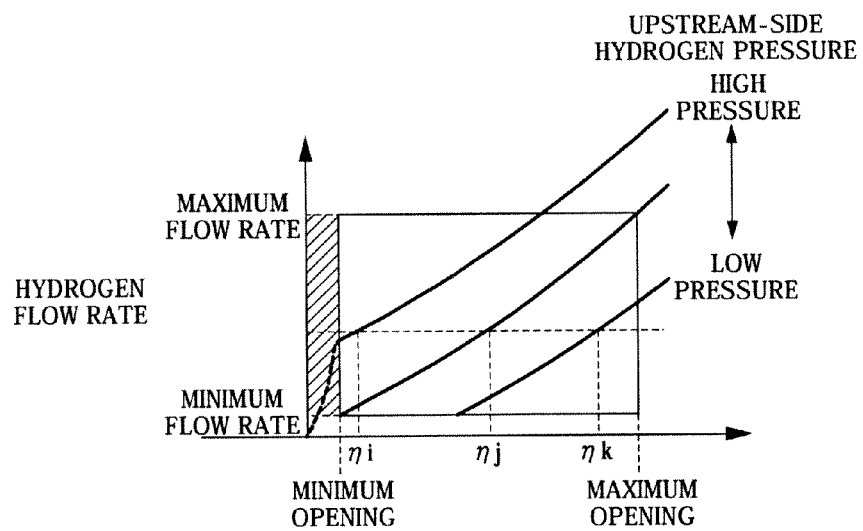
FIG. 16 is a diagram showing a characteristic of a second opening map for the hydrogen supply control valve stored in the controller according to the fourth embodiment of this invention.

Refering to FIG. 15, a control routine for the hydrogen supply control valve 23 executed by a controller 30 of the fuel cell system 100 according to the fourth embodiment is described. Contents of Steps S101 to S107 of FIG. 15 are not described in detail since being similar to Steps S101 to S107 of FIG. 2 in the first embodiment.

After calculating the required hydrogen flow rate Q in Step S102, the controller 30 performs the processing of Step S113.

In Step S113, the controller 30 calculates a second opening of the hydrogen supply control valve 23 based on the required hydrogen flow rate Q calculated using a deviation between the target hydrogen pressure $P_T$ and the downstream-side hydrogen pressure $P_L$ and the upstream-side hydrogen pressure $P_H$. The controller 30 calculates the second opening based on the required hydrogen flow rate Q and the upstream-side hydrogen pressure $P_H$ by referring to an opening map which is stored in a ROM beforehand and has a characteristic shown in FIG. 16.

In Step S114, the controller 30 determines whether or not the calculated second opening is larger than the minimum opening.

If the upstream-side hydrogen pressure $P_H$ is high, it is necessary to precisely control the opening of the hydrogen supply control valve 23 when the hydrogen flow rate is set to be low. Particularly in a hatched area of FIG. 16, flow rate controllability by the hydrogen supply control valve 23 is deteriorated. An opening at which the flow rate controllability of the hydrogen supply control valve 23 starts being deteriorated in this way is set as the minimum opening.

If the second opening is larger than the minimum opening in Step S114 of FIG. 15, the controller 30 performs the processing of Step S115.

In Step S115, the controller 30 sets the second opening as the required opening η and sets the opening time ratio ω at 1. In this way, the opening time $T_O$ of the hydrogen supply control valve 23 is set equal to the control cycle T and the closing time $T_C$ is set at 0.

If the process proceeds to Step S107 from Step S114 via Step S115, the hydrogen supply control valve 23 is constantly opened at the required opening η during the control cycle T, whereby hydrogen is continuously supplied to the fuel cell stack 10. Accordingly, if the second opening calculated in Step S113 is larger than the minimum opening, hydrogen is continuously supplied to the fuel cell stack 10 as shown in FIG. 17 and the hydrogen flow rate is regulated only by the opening of the hydrogen supply control valve 23.

On the other hand, if the second opening is determined to be smaller than the minimum opening in Step S114 of FIG. 15, the controller 30 performs the processing of Step S103. In Step S103, the controller 30 calculates a first opening of the hydrogen supply control valve 23 corresponding to the required hydrogen flow rate Q when it is assumed that the upstream-side hydrogen pressure $P_H$ is 1 MPa, and sets the first opening as the required opening η. Note that the first opening is calculated as an opening equal to or larger than the minimum opening.

In Steps S104 to S106, the controller 30 calculates the opening time $T_O$ and the closing time $T_C$ based on the required opening η and the upstream-side hydrogen pressure $P_H$.

Figure 17:
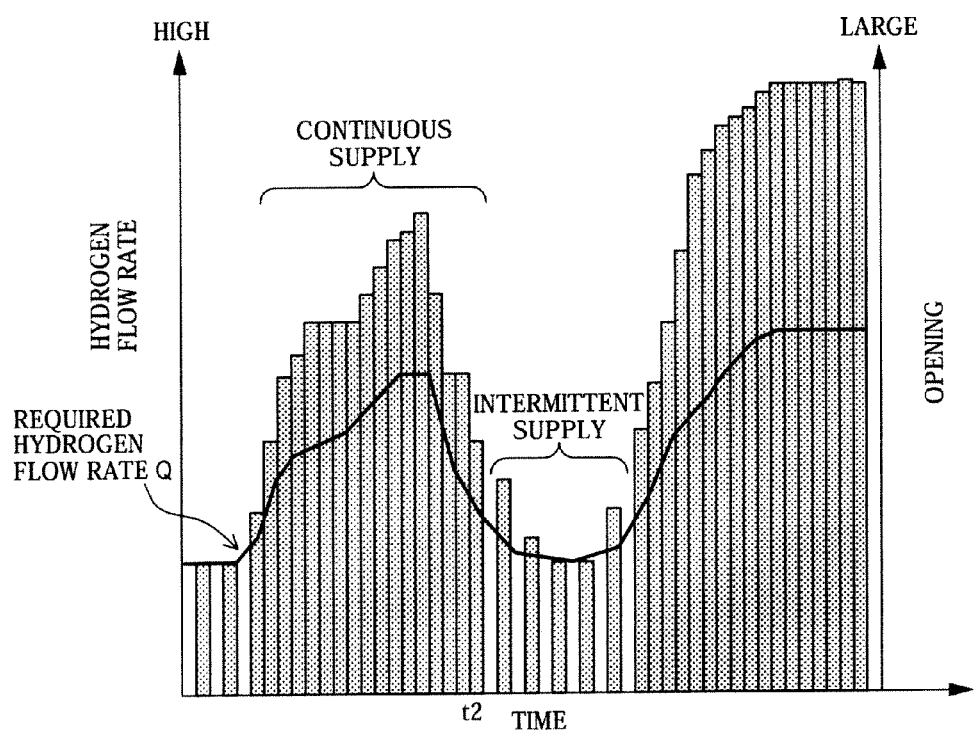
FIG. 17 is a timing chart showing an execution result of the control routine by the controller according to the fourth embodiment of this invention.
Figure 18:
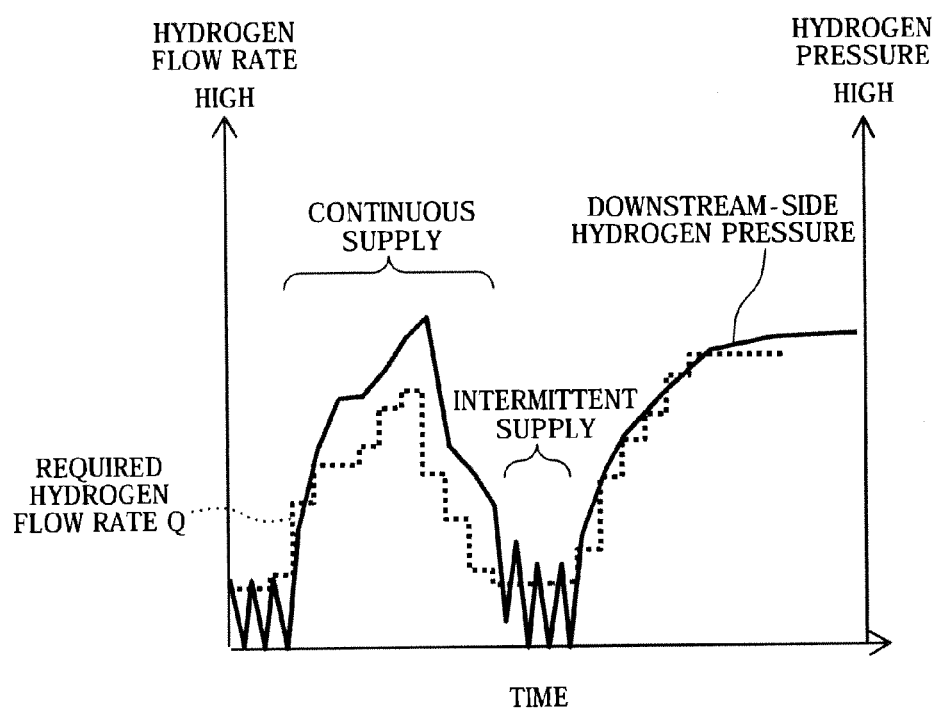
FIG. 18 is a timing chart showing changes in hydrogen flow rate and downstream-side hydrogen pressure.

If the process proceeds to Step S107 from Step S114 via Steps S103 to S106, hydrogen is intermittently supplied to the fuel cell stack 10 as shown in FIG. 17 since the hydrogen supply control valve 23 is opened at the required opening η only during the opening time $T_O$ out of the control cycle T and closed during the other time. By intermittently supplying hydrogen in this way, an average hydrogen flow rate during the control cycle T can be regulated to the required hydrogen flow rate Q and the downstream-side hydrogen pressure $P_L$ can be controlled in a target hydrogen pressure range as shown in FIG. 18.

Note that the processings of Steps S108 to S112 of FIG. 9 may be performed instead of the processings of Steps S103 to S106 of the control routine of FIG. 15. In this case, the opening time and the closing time of the hydrogen supply control valve 23 are calculated based on the target hydrogen pressure and the downstream-side hydrogen pressure in the fuel cell stack 10, and the first opening equal to or larger than the minimum opening is calculated based on the opening time and the upstream-side hydrogen pressure and set as the required opening η.

Because of the above, the hydrogen supply mechanism 20 of the fuel cell system 100 can obtain the following effects.

In the hydrogen supply mechanism 20, hydrogen is continuously supplied by setting the second opening of the hydrogen supply control valve 23 as the required opening and setting the closing time at 0 when the second opening calculated based on the target hydrogen pressure, the downstream-side hydrogen pressure and the upstream-side hydrogen pressure is larger than the minimum opening. Hydrogen is intermittently supplied by setting the first opening equal to or larger than the minimum opening as the required opening and controlling the opening and closing of the hydrogen supply control valve 23 when the second opening is smaller than the minimum opening. In this way, the hydrogen supply mechanism 20 need not include a pressure reducing valve in the hydrogen supply path 22 at the upstream side of the hydrogen supply control valve 23 and can stably supply hydrogen by a simple construction.

Since a frequency of intermittently controlling the hydrogen supply control valve 23 is reduced in the hydrogen supply mechanism 20, the life of the hydrogen supply control valve 23 can be extended. Further, the occurrence of pulsation of the downstream-side hydrogen pressure caused by the intermittent control of the hydrogen supply control valve 23 can be suppressed and the deterioration of an electrolyte film in the fuel cell stack 10 can be suppressed.

In the hydrogen supply mechanism 20, a state is switched from a hydrogen continuously supplying state to a hydrogen intermittently supplying state and the downstream-side hydrogen pressure pulsates, whereby hydrogen in the fuel cell stack 10 can be diffused. This enables hydrogen concentration distribution in a fuel gas flow path of the fuel cell stack 10 to be made uniform and enables produced water staying in the fuel gas flow path and impurity gas such as nitrogen permeating through the electrolyte film from an air supply mechanism to be discharged.

Although this invention has been described above through several specific embodiments, this invention is not limited to the above respective embodiments. A person skilled in the art can make various modifications or changes to these embodiments within the technical scope of the invention as claimed.

This invention has been described above through several specific embodiments, the present invention is not limited to the above respective embodiments. A person skilled in the art can make various modifications and changes to these embodiments within the technical scope of the invention as claimed.

A required opening η described below corresponds to the required opening obtained from the first opening in the fourth embodiment.

Figure 19:
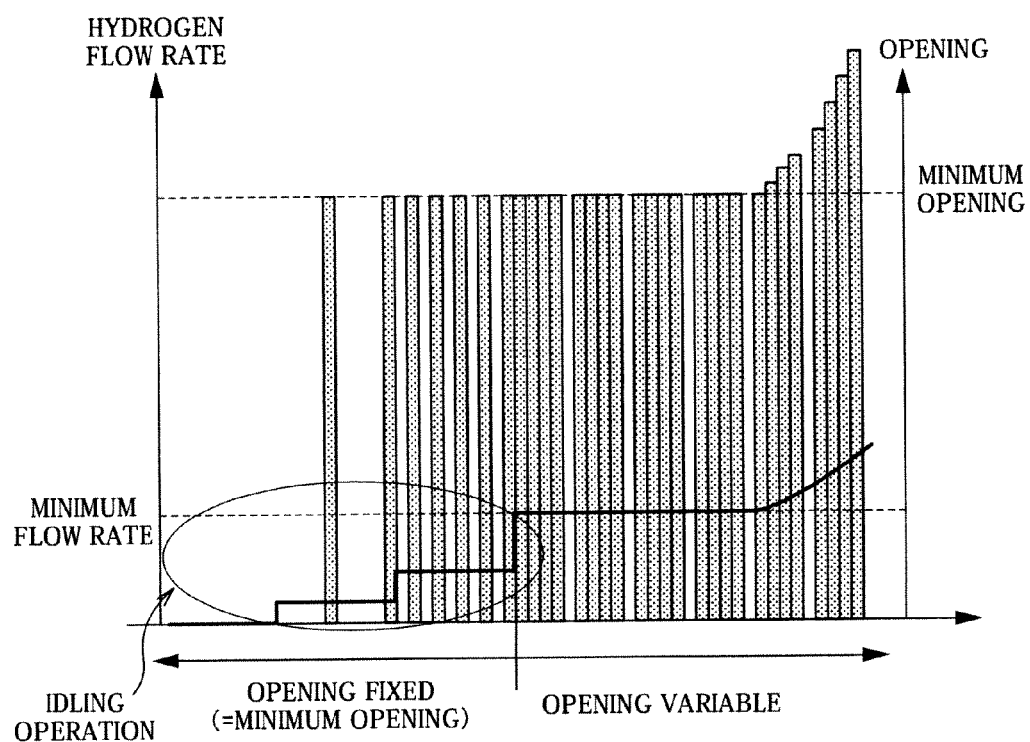
FIG. 19 is a timing chart showing a control for the hydrogen supply control valve during an idling operation of a fuel cell stack.

If the target hydrogen pressure $P_T$ is lower than 20 kPa and the fuel cell stack 10 is in an idling state, as shown in FIG. 19, the required opening η of the hydrogen supply control valve 23 may be maintained at a minimum opening set beforehand and the opening time $T_O$ and the closing time $T_C$ may be increased and decreased so that the downstream-side hydrogen pressure $P_L$ reaches the target hydrogen pressure $P_T$. This enables the control of a low flow rate equal to or below a minimum flow rate by the hydrogen supply control valve 23. Note that the opening time $T_O$ may be maintained at a predetermined minimum time and the required opening η of the hydrogen supply control valve 23 may be increased or decreased so that the downstream-side hydrogen pressure $P_L$ reaches the target hydrogen pressure $P_T$ when the fuel cell stack 10 is in the idling state.

When hydrogen in the high-pressure hydrogen tank 21 is consumed and the upstream-side hydrogen pressure $P_H$ reaches a first low-pressure state where the upstream-side hydrogen pressure $P_H$ is equal to or below 1 MPa, a change in the hydrogen flow rate at the hydrogen supply control valve 23 resulting from an upstream-side hydrogen pressure change becomes smaller. When the upstream-side hydrogen pressure $P_H$ reaches the first low-pressure state, hydrogen cannot be supplied at a maximum flow rate depending on a vehicle operating state even if the required opening η of the hydrogen supply control valve 23 is maintained at a maximum opening. When the upstream-side hydrogen pressure $P_H$ reaches the low-pressure state, the hydrogen supply control valve 23 may be constantly opened by setting the closing time $T_C$ at 0 and setting the opening time $T_O$ equal to the control cycle T regardless of the state of the upstream-side hydrogen pressure $P_H$ and the required opening η of the hydrogen supply control valve 23 may be increased or decreased so that the downstream-side hydrogen pressure $P_L$ reaches the target hydrogen pressure $P_T$ instead of respectively changing the required opening η, the opening time $T_O$ and the closing time $T_C$ of the hydrogen supply control valve 23. This can facilitate the control for the hydrogen supply control valve 23. Note that the required opening η of the hydrogen supply control valve 23 may be set at the maximum opening and the opening time $T_O$ and the closing time $T_C$ may be increased and decreased so that the downstream-side hydrogen pressure $P_L$ reaches the target hydrogen pressure $P_T$ instead of constantly opening the hydrogen supply control valve 23 and increasing or decreasing the required opening η.

Figure 20:
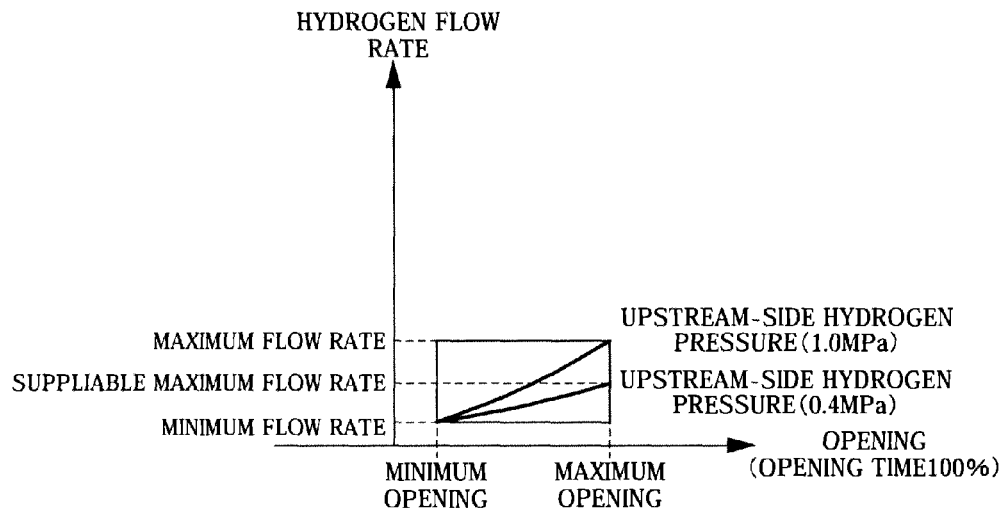
FIG. 20 is a diagram showing a relationship between upstream-side hydrogen pressure and suppliable maximum flow rate.
Figure 21:
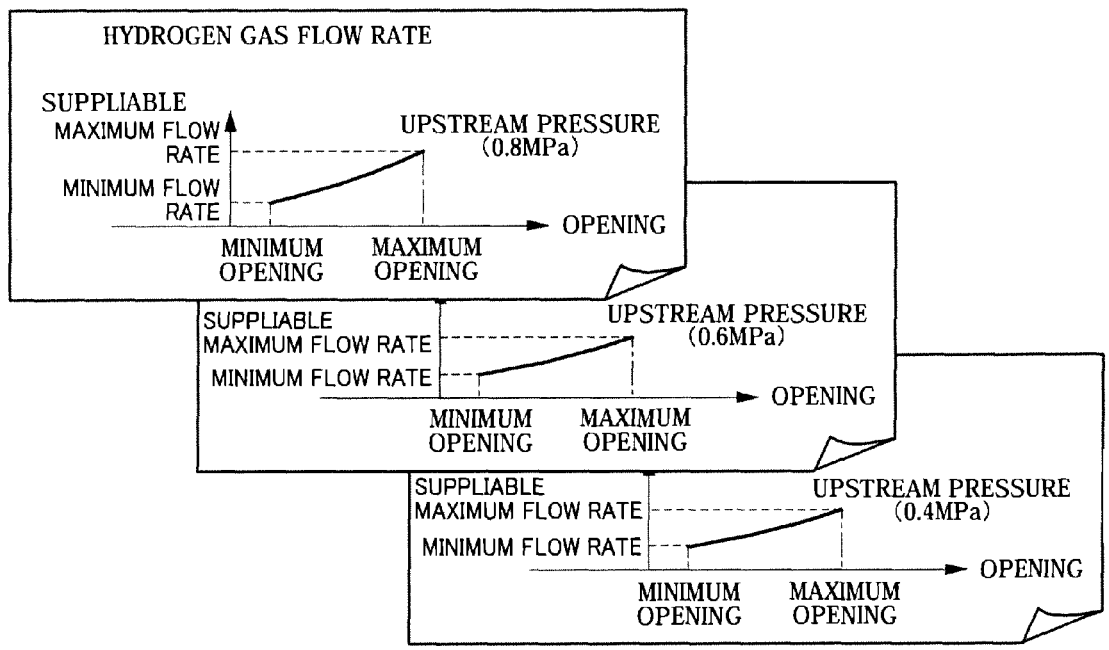
FIG. 21 is a diagram showing an option on the suppliable maximum flow rate which can be adopted by the respective embodiments.

Further, when the upstream-side hydrogen pressure $P_H$ falls below 1 MPa and reaches a second low-pressure state equal to or below, for example 0.4 MPa, the required hydrogen flow rate Q cannot be supplied depending on the vehicle operating state even if the required opening η of the hydrogen supply control valve 23 is set at the maximum opening as shown in FIG. 20. Thus, when the upstream-side hydrogen pressure $P_H$ reaches the second low-pressure state, the output power of the fuel cell stack 10 is limited by reducing the target hydrogen pressure $P_T$ based on the vehicle operating state and the upstream-side hydrogen pressure $P_H$. An invalid remaining amount of hydrogen in the high-pressure hydrogen tank 21 can be substantially zeroed by storing the maximum flow rate at the maximum opening of the hydrogen supply control valve 23 in the low-pressure state for each upstream-side hydrogen pressure as shown in FIG. 21.

Concerning the above description, the contents of Japanese Patent Application No. 2009-147731 filed on Jun. 22, 2009 are incorporated hereby by reference.

INDUSTRIAL APPLICABILITY

This invention brings about particularly preferable effects in application to a fuel gas supply device of a fuel cell system.

The embodiments of this invention in which an exclusive property or privilege are claimed are defined as follows.

The invention claimed is:

1. A fuel gas supply device for supplying fuel gas to a fuel cell stack which generates power using the fuel gas and oxidant gas, comprising:
  a fuel tank configured to store the fuel gas;
  a fuel gas path connecting the fuel tank and the fuel cell stack;
  a control valve provided in the fuel gas path and configured to control a supply amount of the fuel gas;
  an upstream-side pressure sensor for detecting an upstream-side pressure of the fuel gas at an upstream side of the control valve;
  a downstream-side pressure sensor for detecting a downstream-side pressure of the fuel gas at a downstream side of the control valve; and
  a programmable controller programmed to:
    calculate a required opening, an opening time and a closing time of the control valve based on a target fuel gas pressure in the fuel cell stack, the detected downstream-side pressure and the detected upstream-side pressure; and
    control the control valve using the calculated required opening, opening time and closing time.

2. The fuel gas supply device as defined in claim 1, wherein the programmable controller is programmed to:

calculate the required opening of the control valve based on the target fuel gas pressure in the fuel cell stack and the detected downstream-side pressure and calculate the opening time and the closing time of the control valve based on the required opening and the detected upstream-side pressure; or calculate the opening time and the closing time of the control valve based on the target fuel gas pressure in the fuel cell stack and the detected downstream-side pressure, and calculate the required opening of the control valve based on the opening time and the detected upstream-side pressure;

control the control valve using the calculated required opening, the opening time and the closing time.

3. The fuel gas supply device as defined in claim 2, wherein the programmable controller is programmed to determine whether or not a vehicle is in acceleration based on a deviation between the target fuel gas pressure and the downstream-side pressure and to make a correction to increase the required opening, reduce the opening time and increase the closing time if the vehicle is in acceleration.

4. The fuel gas supply device as defined in claim 2, wherein the programmable controller is programmed to determine whether or not flooding is occurring in the fuel cell stack and to make a correction to increase the required opening, reduce the opening time and increase the closing time if flooding is occurring.

5. The fuel gas supply device as defined in claim 2, wherein the programmable controller is programmed to maintain the required opening at a predetermined opening and to control the opening time and the closing time so that the downstream-side pressure reaches the target fuel gas pressure during an idling operation of the fuel cell stack.

6. The fuel gas supply device as defined in claim 2, wherein the programmable controller is programmed to maintain the opening time at a predetermined time and to control the required opening so that the downstream-side pressure reaches the target fuel gas pressure during an idling operation of the fuel cell stack.

7. The fuel gas supply device as defined in claim 2, wherein the programmable controller is programmed to maintain the required opening at a maximum opening and to control the opening time and the closing time so that the downstream-side pressure reaches the target fuel gas pressure when the upstream-side pressure reaches a first low-pressure state.

8. The fuel gas supply device as defined in claim 2, wherein the programmable controller is programmed to maintain the control valve to be constantly opened and to control the required opening so that the downstream-side pressure reaches the target fuel gas pressure when the upstream-side pressure reaches a first low-pressure state.

9. The fuel gas supply device as defined in claim 7, wherein the programmable controller is programmed to limit an output power of the fuel cell stack by reducing the target fuel gas pressure based on a vehicle operating state and the upstream-side pressure when the upstream-side pressure reaches a second low-pressure state lower than the first low-pressure state.

10. The fuel gas supply device as defined in claim 8, wherein the programmable controller is programmed to limit an output power of the fuel cell stack by reducing the target fuel gas pressure based on a vehicle operating state and the upstream-side pressure when the upstream-side pressure reaches a second low-pressure state lower than the first low-pressure state.

11. The fuel gas supply device as defined in claim 2, wherein the programmable controller is programmed to:

calculate a second opening of the control valve based on the target fuel gas pressure in the fuel cell stack, the downstream-side pressure and the upstream-side pressure;

control the control valve so that the control valve is constantly opened at the required opening by setting the second opening as the required opening and setting the closing time at zero when the second opening is larger than a predetermined minimum opening; and when the second opening is smaller than the minimum opening, calculate a first opening equal to or larger than the minimum opening based on the target fuel gas pressure and the detected downstream-side pressure, set the first opening as the required opening, and calculate the opening time and the closing time of the control valve based on the required opening and the detected upstream-side pressure; or calculate the opening time and the closing time of the control valve based on the target fuel gas pressure and the detected downstream-side pressure, calculate the first opening to be equal to or larger than the minimum opening based on the opening time and the detected upstream-side pressure, and set the first opening as the required opening.

12. The fuel gas supply device as defined in claim 2, wherein the programmable controller is programmed to control the control valve using the calculated required opening, opening time and closing time so as to permit intermittent supply of the fuel gas to the fuel cell stack.

* * * * *